M. A. MARQUETTE.
PROCESS FOR MAKING STRAND FABRIC.
APPLICATION FILED JAN. 6, 1919.

1,304,694.                                  Patented May 27, 1919.

INVENTOR.
Melvon A. Marquette.
BY Chapin + Neal.
ATTORNEYS.

UNITED STATES PATENT OFFICE.

MELVON A. MARQUETTE, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

PROCESS FOR MAKING STRAND FABRIC.

1,304,694.   Specification of Letters Patent.   Patented May 27, 1919.

Application filed January 6, 1919. Serial No. 269,751.

*To all whom it may concern:*

Be it known that I, MELVON A. MARQUETTE, a citizen of the United States of America, residing at Springfield, in the county of Hampden and State of Massachusetts, have invented certain new and useful Improvements in Processes for Making Strand Fabric, of which the following is a specification.

My invention relates to the manufacture of sheets with strands running longitudinally therein and held assembled by sheet-like material, and more particularly to a process for making strand fabric.

In the building up of pneumatic tire casings, commonly called "tires", there is frequently used material composed of a number of parallel strands, generally cords, embedded in, and held together by, tacky unvulcanied rubber, to form, what may be termed "strand fabric." Though not restricted thereto, it is to the production of such material that the process of my invention more particularly relates, and to making of such a strand fabric in which a layer of unvulcanized rubber is, in effect, woven in and out between the strands, generally cords, to form a species of weft.

An object of my invention is to provide a process for the rapid and relatively inexpensive manufacture of strand fabric.

To this end, and also to improve generally upon processes of the character indicated, my invention consists in the following matters hereinafter described and claimed.

In the accompanying drawings:—

Figure 1:
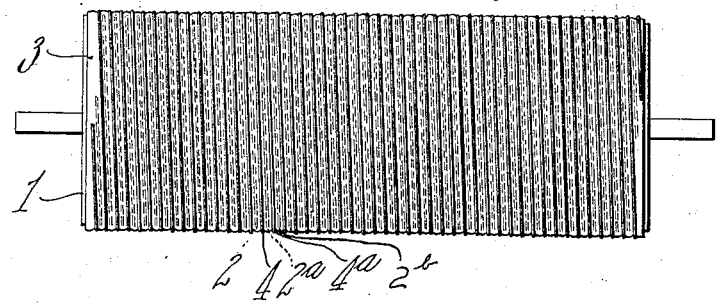
Figure 1 is a front elevation of a rotatable mandrel, with a layer of completed fabric, produced in accordance with my invention, lying thereon and ready for removal therefrom, the spacing and size of the strands being exaggerated (in comparison to the usual size of the drum) the better to illustrate the fabric.
Figure 2:
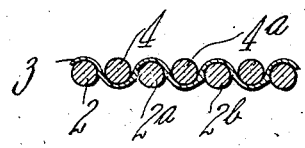
Fig. 2 is a somewhat conventional enlarged cross section of the fabric, made by my process.

As preferably practised, my process includes the use of a rotatable mandrel or drum 1 upon which to build up the fabric; the spiral (screw-thread-like) winding of a strand 2 about the mandrel to form a strand-layer with its consecutive turns, as $2^a$ and $2^b$, sufficiently spaced apart to permit of the insertion, between each turn and the next, of another strand as $4^a$, together with a quantity of tacky unvulcanized rubber 3 or like "weft" material; the applying of a sheet 3 of tacky unvulcanized rubber to the said strand-layer by wrapping such sheet about the drum, and so about the layer of strands, and the spiral winding of a second strand 4 about the drum, with its turns as $4^a$ laid one in each of the spaces between the successive turns of the first strand-layer, such second layer being wound on with the strand under sufficient tension to force the turns of the strand, and the sheet of rubber 3, down in between the turns of the first layer any desired amount determined by the tension applied, thereby to firmly stick all the turns to the rubber and embed them therein, and in effect, weave the layer of rubber in and out between the successive turns of the layers.

The strand material may be guided on to the drum with its turns properly (preferably substantially equally) spaced in any desired manner, and the strand may be tensioned in any desired manner. I have found it feasible to perform these operations by hand, but, if desired, mechanical means may, of course, be utilized.

When, in winding the first strand-layer about the drum, it is laid directly in contact with the drum, desirably care is taken to wind the strand thereon, and hold or fasten it, with sufficient tightness or tension to insure that the strands shall stay as placed, during the further operations; and, indeed, an initial coating of rubber cement on the drum, or, say, a shallow spiral groove in the drum, will often be found desirable, though not essential.

Figure 3:
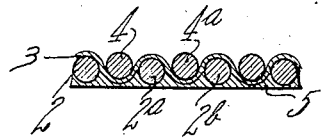
Fig. 3 is a somewhat conventional enlarged cross-section of the fabric, made by my process, when a layer of rubber is wrapped on the drum prior to the winding of the strands about the drum.

I find it highly desirable to apply my process to the production of a fabric having a backing-layer of unvulcanized tacky rubber, and, to this end, I wrap (Fig. 3), on occasion, an initial layer 5 of unvulcanized tacky rubber about the drum, so that, when the first layer 2 of strands is wound onto the drum, it is received upon said layer 5 and its turns stuck thereto, and also embedded therein to such extent as is desired. The depth of embedment is, of course, determined by the tension under which the strand is applied, but due to the somewhat plastic nature of the rubber, it need not be great, and a tension such as that used to place the cords tightly about the drum, in cases where no layer 5 is used, is found sufficient in many cases. This gives a sheet, not only with a layer of what may be termed "weft" rubber, but also with the turns of the first layer wholly inclosed in rubber, such a fabric being highly desirable for certain purposes.

Upon the completion of the fabric, it is slit across the drum, desirably on the bias to produce "bias fabric," and removed to give a flat sheet, the mandrel being so surfaced (as by being of wood) as is well understood in similar cases in the art, as to permit the ready detachment of the tacky fabric therefrom without injuring or tearing the fabric, the layer 5, in cases where it is used, of course, adhering to the fabric 2—3—4 and being, in effect, an integral part thereof.

It will be seen that I have provided a process for the rapid and relatively inexpensive production of strand fabric, more particularly cord fabric, comprising a series of "warp" strands with a "weft" of rubber woven in and out between the strands.

Having then described my invention, what I claim as new is:—

1. The process which consists in making use of a drum, winding a first strand spirally about said drum with turns of the strand spaced each from the other sufficiently to admit another strand, together with "weft" material, therebetween, wrapping a flexible, tacky sheet of "weft" material about said drum to enwrap said turns of strand, winding a second strand spirally about said drum and upon said sheet, with its turns located to lie at the spaces between the turns of said first named strand, while applying tension to said second strand sufficient to force the turns of such strand, and said sheet, down between the turn of said first strand, and then removing the so made fabric from said drum; substantially as described.

2. The process which consists in making use of a drum carrying a layer of tacky covering material thereon, winding a first strand spirally about said drum and upon said layer with turns of the strand spaced each from the other sufficiently to admit another strand, together with "weft" material, therebetween, wrapping a sheet of tacky flexible "weft" material about said drum to enwrap said turns of strand, winding a second strand spirally about said drum and upon said sheet, with its turns located to lie at the spaces between the turns of said first-named strand, while applying tension to said second strand sufficient to force the turns of such strand, and said sheet, down between the turns of said first strand, and then removing the so made fabric together with said layer from said drum; substantially as described.

MELVON A. MARQUETTE.